Sept. 6, 1960 F. W. DE VRIJER 2,951,903

MULTIPLEX TRANSMISSION SYSTEM

Filed Oct. 23, 1952

INVENTOR

FREDERIK WILLEM DE VRIJER

BY

Fred M Vogel

AGENT

United States Patent Office 2,951,903

Patented Sept. 6, 1960

2,951,903

MULTIPLEX TRANSMISSION SYSTEM

Frederik Willem de Vrijer, Eindhoven, Netherlands, assignor, by mesne assignments, to North American Philips Company, Inc., New York, N.Y., a corporation of Delaware Filed Oct. 23, 1952, Ser. No. 316,424

Claims priority, application Netherlands Nov. 8, 1951

6 Claims. (Cl. 179—15)

This invention relates to a multiplex transmission system in which a plurality of different signals at the transmitting end are supplied to a common transmission path and divided in a receiver with the use of dividing means.

As is well-known, the multiplex transmission systems commonly used are, as a rule, subdivided into two classes, viz.:

(1) Multiplex systems with frequency division in which the different signals are shifted to different ranges of frequencies and subsequently transmitted, as a rule after being modulated on a carrier-wave common to all signals. At the receiving end, the signals are brought back to the initial positions in the frequency band.

Such systems are used, for example, in carrier-wave telephony or in telegraphic communication, but they may also be used, for example, for colour-television broadcast in which, for example, information about the brightness of the image is transmitted as a black-white signal in the side-band of a high-frequency carrier-wave and, for example, two or three auxiliary carrier-waves modulated on the said carrier-wave transmit in their side-bands information about the colour components of the image.

(2) Multiplex systems with time-division in which during each of a number of cyclically succeeding periods information about one signal only is transmitted in cyclic sequence. Such systems also are used for telephony purposes but they may also be used for colour-television broadcast, for example, both for systems in which the frames are written in succession in one of the three colour components and for those in which interpunctuation is used.

In addition, there are other multiplex transmission systems, for example those in which a carrier-wave is modulated in amplitude by one signal and modulated in phase or frequency by another signal.

The present invention relates to all the said systems for multiplex transmission.

Due to the fact that in multiplex transmission systems a finite band-width only is available, as is generally the case in all systems of communication, so that a finite band-width only is available for each signal to be transmitted, it is fundamentally impossible for the signal supplied at the transmitting end to the common transmission path to be divided completely into the original signals.

Furthermore, at the receiving end use is made of a receiver which likewise has a finite band-width only, which is also the case with the dividing means, so that after the division complete separation between the various signals is not obtained, each signal still comprising components of one or more of the other signals.

This phenomenon is known in telephony under the name "crosstalk."

If the transmitter and the receiver furthermore comprise devices which are required to operate in synchronism, deviation from this synchronism also frequently gives rise to crosstalk.

The object of the invention is to decrease crosstalk resulting from the properties of the receiver and also from the transmitter and, as the case may be, from the transmission path.

The multiplex transmission system according to the invention has the characteristic that each signal obtained after division in such a receiver is negatively back-coupled with the corresponding signal at the transmitting end.

In order that the invention may be readily carried into effect, it will now be described in detail with reference to the accompanying drawing, given by way of example.

Fig. 1 shows part of a colour-television transmission system in block diagram in which it is assumed for the sake of simplicity that information about the red colour component R and the blue colour component B only is transmitted.

Figure 1:
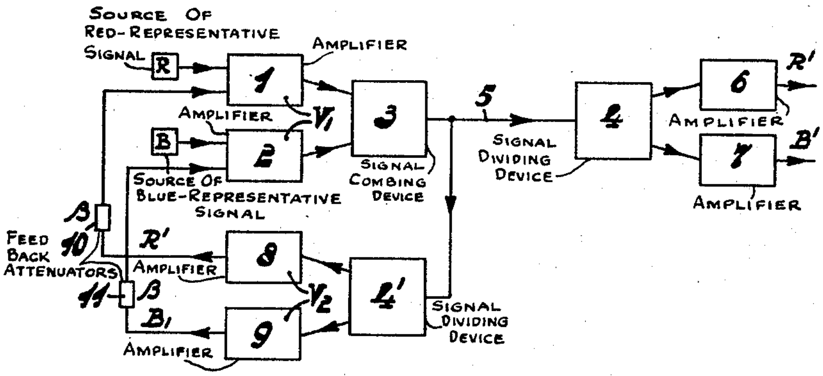
Fig. 1 is a diagrammatic view serving to explain the principles of the invention more fully.

The signal R is supplied by way of an amplifier 1 to a device 3, the signal B also being supplied by way of an amplifier 2 to the device 3.

The signals R and B are combined in the device 3 and subsequently supplied either, for example, with frequency division or, for example, with time-division to a device 4 at the receiving end by way of a common transmission path 5. The signals are divided again in the device 4 at the receiving end, the signals obtained after division being supplied to amplifiers 6 and 7.

In the red channel a signal R′ occurs, which also comprises components of the blue signal due to crosstalk. A signal B′ is received in the channel 7. The signal occurring in the output circuit of the device 3 at the transmitting end is also supplied to a device 4′, which is preferably identical with the device 4 at the receiving end, so that the extent of crosstalk brought about by the device 4 is the same as that brought about by the device 4′.

It is already mentioned here that, if the transmitting end is constructed in the form of a broadcast transmitter, the program transmitted may be received by a large number of receivers and these receivers will, as a rule, not be identical.

However, all receivers designed by different designers will be required to satisfy certain conditions which are determined by the system used at the transmitting end, so that more particularly the means for dividing the signals are of the same nature in all receivers and will bring about approximately the same extent of crosstalk.

The signals are divided in the device 4′ at the transmitting end and subsequently amplified by amplifiers 8 and 9.

If the properties of the transmission path are not taken into consideration and if it is assumed for the sake of simplicity that the amplifiers 6 and 7 are identical with the amplifiers 8 and 9, the output signals of the last-mentioned amplifiers will be, as before, R′ and B′.

It is convenient to refer to the elements 4, 6 and 7 as being the "main" receiver, and to refer to the elements 4′, 8 and 9 as the "auxiliary" receiver.

The signal R′ is supplied as a negative feed-back signal by way of a potentiometer 10 having a division ratio $\beta$ back to the input of the amplifier 1 of the red channel.

Similarly, the blue signal B′ is supplied by way of an attenuator 11 back to the input of the blue amplifier 2.

The amplifiers 1, 2 and 8, 9 respectively amplify by a factor $V_1$, $V_2$ respectively.

Then there applies for the amplifiers 1 and 2 that:

the input voltage is for (1) $R-\beta R'$ (2) $B-\beta B'$ and the output voltage is for $$(1)\qquad V_1(R-\beta R')$$

$$(2)\qquad V_1(B-\beta B')$$

If the transmission path 5 is not taken into consideration, the extent of crosstalk brought about by the devices 3 and 4 is the same as that brought about by the devices 3 and 4'.

Consequently, not only the output voltage of the amplifier 1, but also a part $\alpha_{12}$ of the output voltage of the amplifier 2 occurs at the input of the amplifier 8. Similarly, a part $\alpha_{21}$ of the output voltage of the amplifier 1 occurs at the input of the amplifier 9 as a result of crosstalk.

Consequently, the relative crosstalk factors without negative feedback are $\alpha_{12}$ and $\alpha_{21}$. For the input voltages of the amplifiers 8 and 9 we then find:

$$(8)\qquad V_1(R-\beta R')+\alpha_{12}V_1(B-\beta B')$$

$$(9)\qquad \alpha_{21}V_1(R-\beta R')+V_1(B-\beta B')$$

and for the output voltages R' and B' of said amplifiers we find:

$$R'=V_1V_2(R-\beta R')+\alpha_{12}V_1V_2(B-\beta B')$$

$$B'=\alpha_{21}V_1V_2(R-\beta R')+V_1V_2(B-\beta B')$$

If, for example, R' is resolved from the two said equations, then we find:

$$R'\frac{1}{V_1}\frac{D}{V_2}=R(1+V_1V_2\beta(1-\alpha_{12}\alpha_{21}))+\alpha_{12}B$$

in which D is the discriminant of the equations which, however, does not comprise R and B.

Consequently, the ratio between the blue component and the red component in the signal R' is:

$$\alpha'_{12}=\frac{\alpha\qquad 12}{1+V_1V_2\beta\ (1-\alpha_{12}\alpha_{21})}$$

which is the relative crosstalk factor when using negative feedback.

It has been found from experiments with a system of the kind shown in Fig. 1 but in which negative feedback was not used that under certain conditions $\alpha_{12}$ and $\alpha_{21}$ may be about 0.5.

If in the system according to the invention, for example, a negative feedback factor $V_1V_2\beta=100$ is used, we find $\alpha'_{12}=6.6\ 10^{-3}$ when starting from the value 0.5 for the relative crosstalk factor, so that the extent of crosstalk is considerably reduced.

It will be evident that the above-mentioned calculation is intended only as an illustration of the principle of the invention, since in a practical case the frequency variablility of the different factors playing a part in the calculation has to be taken into account.

Furthermore, as in the known uses of negative feedback, it is necessary to take the usual precautions to ensure that any oscillating action is avoided.

As will be obvious without further explanation, it is fundamentally possible to include the receiver equipment 4, 6, 7 itself in the negative feedback circuits, so that the crosstalk effects which may be attributable to the transmission path may also be reduced. However, in this case, it is necessary for the signals obtained at the receiving end to be supplied by way of a transmission path back to the transmitter.

Furthermore, it is mentioned that in Fig. 1 two signals only are transmitted, but it is evident that this may be extended with more signals.

Figure 2:
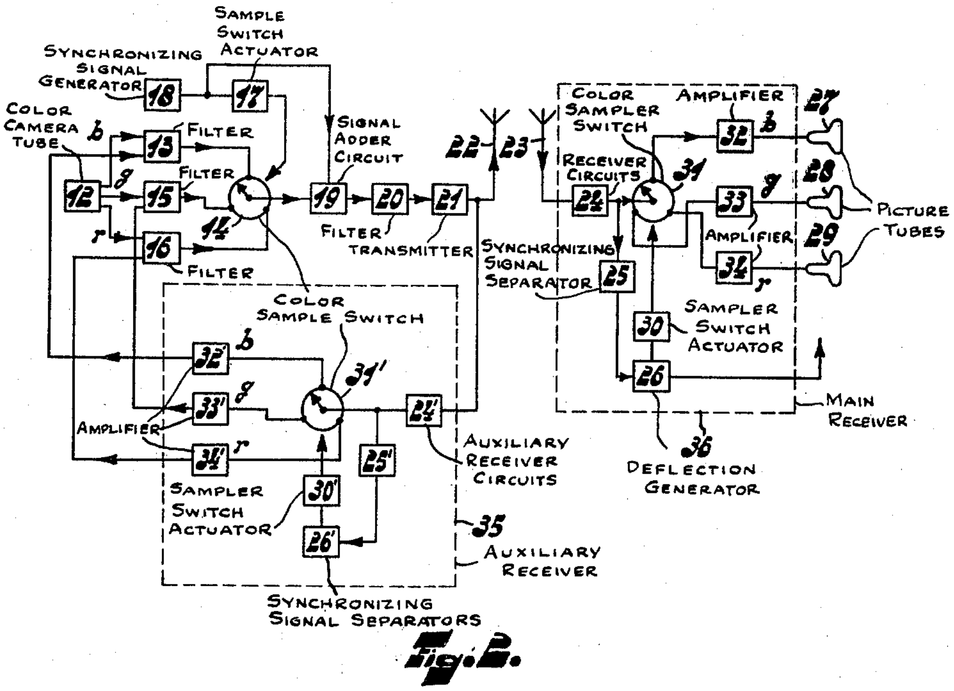
Fig. 2 is a block diagram of part of one embodiment of a system according to the invention for the transmission of sequential colour television.

Fig. 2 shows a block diagram of part of a known sequential color-television transmission system in which the parts for the transmission of sound and for the separate transmission of the high frequencies of the black-white signals, which latter transmission also occurs in this system, are omitted for the sake of simplicity. According to the invention, negative feed-back is used in this known system.

The device 12 comprises a camera tube for each of the three prime colours red, blue and green.

The blue signal *b* is supplied by way of a low-pass filter 13 having a transmission range of 0.2 mc./s. to a colour switch (sampler) 14. The green signals *g* and the red signals *r* are likewise supplied through similar filters 15 and 16 to the colour switch 14.

Said colour switch is an electronic switch scanning and transmitting the momentary amplitude of the image signal of each colour, for example, $3.6\times10^6$ times per second.

The switch is controlled with the use of a device 17 by synchronising pulses which are derived from a generator 18 which also generates the line-synchronising and image-synchronising pulses.

The frequency of the pulses by which the switch 14 is controlled is equal to an odd multiple of half the frequency of the line-synchronising pulses, so that it is ensured in a manner which otherwise is not essential here that interpunctuation takes place at the receiving end.

The narrow pulses resulting from the scanning operations by the switch 14 are supplied by way of a device 19 in which the synchronising pulses coming from the generator 18 are also added to the signal, to a low-pass filter 20 having a transmission range of 0.4 mc./s., so that the narrow pulses of each colour are deformed.

The deformed voltages of the three colours are combined, this signal being supplied to a high-frequency image transmitter 21 and transmitted via an aerial 22.

The signal received by way of an aerial 23 at the receiving end is supplied to a device 24 comprising the conventional receiver circuits of a high-frequency stage, mixing stage, intermediate-frequency stage and detector.

The synchronising pulses are separated from the video signal in a synchronising separator 25 and supplied to deflection generators 26 in which the currents are generated for the deflection of the electron rays in cathode-ray tubes 27, 28 and 29 reproducing blue, green and red colours.

The synchronising pulses are supplied from the device 26 to a generator 30 in which the control pulses for an electronic colour switch 31 are generated. The output voltage of the device 24 is supplied to colour switch 31. Said switch operates in synchronism with switch 14 of the transmitter, connecting at the right moment the video-signal for a short period, to the correct video amplifier 32, 33, 34 respectively, each of which is connected in series with a cathode-ray tube 27, 28, 29 respectively.

In such a colour television system crosstalk between the three colour components occurs at the receiving end. Such would not be the case in theory if the blue, green and red signals to be transmitted always remained constant and hence each would comprise only a direct-current component and if the scanning operations by the colour switch in the transmitter and the receiver would always take place for an infinitely short period. However, neither of these is the case.

Crosstalk may be considerably reduced by the use of negative feedback. For this purpose the transmitter includes an auxiliary receiver 35, which is substantially identical with the part 36 of the receiver and of which the component parts are correspondingly numbered and relatively distinguished by an accent. The operation of device 35 will be clear after the foregoing.

For the sake of completeness it is mentioned that the device 26', in contradistinction with the device 26, need not comprise deflection generators and serves only to further separate the synchronising pulses.

The input voltage of the device 35 is derived from the input voltage for the transmitting aerial 22. However, in many cases, it will be possible to derive the input voltage for the device 35 from the output of the low-pass filter 20 of the transmitter, so that the auxiliary receiver circuits 24′ may be dispensed with, since the crosstalk which is characteristic for this colour-television system is substantially attributable to the composition of the video signal in the transmitter and the division thereof in the receiver.

The output voltages of the amplifier devices 32′, 33′ and 34′ are supplied as negative feedback voltages to the devices 13, 15 and 16 of the transmitter.

It is evident that, in order to obtain the desired negative feedback factor, the amplifiers 32′, 33′ and 34′ may be given suitable gain factors.

It is remarked that the negative feedback factor and hence the amplification of the said amplifiers need not necessarily be the same in the whole frequency range.

Thus, it appeared from an analysis of a system of the kind described with reference to Fig. 2, but in which negative feedback was not used, with a transmission band of $0-f_a$ of the filters 13, 15, 16, a frequency $f_o$ of the colour switches and a transmission band of $0-f_b$ of the filter 20, whilst it was assumed that the scanning operations by the colour switches take place for an infinitely short period, that in principle crosstalk does not occur in the range of frequencies extending from 0 to $f_b-f_o$, but that crosstalk occurs in the remaining part of the frequency band.

What I claim is:

1. A multiplex transmission system comprising a transmitter including a plurality of channels for conveying different signals, means coupled to said channels for combining said signals in a common transmission path, a main receiver responsive to signals transmitted in said path and including first distributor means for separating the combined signal into received signals having variations as determined by the respective said different signals and having undesired crosstalk components from one another, and auxiliary receiver apparatus at said transmitter connected to negatively feedback each signal in said common transmission path, said auxiliary receiver comprising second distributor means coupled to the output of said signal combining means for separating the combined signal into feedback signals having variations as determined by the respective said different signals, means for introducing into each of said feedback signals a cross talk component substantially the same as the undesired crosstalk component introduced in the respective received signal by said main receiver apparatus, and means for applying each of said feedback signals from said second distributor means to the channel conveying the respective different signal.

2. A multiplex transmitter comprising means for producing a plurality of different signals, a plurality of amplifiers, combining means, means for applying each of said plurality of signals to said combining means through a different one of said amplifiers to combine said signals in a common transmission path, distributor means coupled to said combining means for separating the combined signal into feedback signals having variations as determined by the respective said different signals, a plurality of amplifying devices, means for applying each of said feedback signals through a different one of said plurality of amplifying devices to the amplifier to which the respective different signal is applied, and means for introducing into each of said feedback signals a crosstalk component from at least one other of said feedback signals, whereby each signal in the common transmission path is modified according to a crosstalk component and negatively back coupled with the respective signal of said plurality of different signals.

3. A color transmission system comprising a transmitter including a plurality of channels for conveying different color signals, and commutator means coupled to said channels for combining said signals in a common transmission path; a main receiver responsive to signals transmitted in said path and including first distributor means for separating the combined signal into received signals having variations as determined by respective color signals and having undesired crosstalk components from one another; and auxiliary receiver apparatus at said transmitter connected to negatively feedback each signal in said common transmission path, said apparatus comprising second distributor means coupled to the output of said commutator means for separating combined signal into feedback signals having variations as determined by the respective said color signals, and means for introducing into each of said feedback signals a crosstalk component substantially the same as the undesired crosstalk component introduced in the respective received signal by said main receiver, and means for applying each of said feedback signals from said second distributor means to the channel conveying the respective color signal.

4. A multiplex transmission system comprising a transmitter including a plurality of channels for conveying different signals, means coupled to said channels for combining said signals in a common transmission path; a main receiver responsive to signals transmitted in said path and including distributor means for separating the combined signal into received signals having variations as determined by the respective said different signals and having undesired crosstalk components from one another; and auxiliary receiver means at said transmitter connected to be responsive to the combined signals in said path, said auxiliary receiver comprising means for separating said combined signals into individual signal components having variations as determined by the respective different signals and means for negatively feeding back each of said separated individual signal components to the signal channel in said amplifier conveying the respective different signal, said last-named means including means for introducing into said separated individual signal components a crosstalk component substantially the same as the crosstalk component introduced by said main receiver into the respective received signal.

5. A color television transmission system comprising a transmitter including a plurality of channels for conveying different color signals, and means coupled to said channels for combining said signals in a common signal path; a main receiver responsive to signals transmitted in said path and including distributor means for separating said combined signal into received signals having variations as determined by the respective color signal and having undesired crosstalk components from one another; auxiliary receiver means at said transmitter connected to be responsive to the combined signal in said path, said auxiliary receiver comprising means for separating said combined signals into individual signal components having variations as determined by the respective color signals and means for negatively feeding back said individual signal componets to the channel conveying the respective said color signal, and means for introducing into each said individual color component a crosstalk component substantially the same as the undesired crosstalk component introduced by said main receiver in the respective received signal.

6. A color television transmitter comprising camera means for producing a plurality of different color signals, a plurality of low-pass filters, commutator means, means for applying each of said plurality of signals through a different one of said filters to said commutator means to combine said signals in a common transmission path, means for producing synchronizing pulses, means coupled to said pulse producing means for applying a control voltage to said commutator means to control the commutation rate thereof, means responsive to the combined signal and to said synchronizing pulses for adding said pulses to said combined signal, high-frequency transmitting means, an additional filter coupling the output of said adding means to the input of said transmitting means, means coupled to said transmitting means for detecting the signal from said transmitting means, distributor means coupled to the output of said detecting means for separating the detected signal into respective signals corresponding to said plurality of different signals, means coupled to the output of said detecting means for separating the synchronizing pulses from said detected signal, means coupled to said pulse separating means for applying a control voltage to said distributor means to control the distribution rate thereof, a plurality of amplifying devices, and means for applying each of said separated signals through a different one of said amplifying devices to the corresponding signal filter of said plurality of low-pass filters, whereby each signal in the common transmission path is negatively back-coupled with the corresponding signal of said plurality of different signals.

References Cited in the file of this patent

UNITED STATES PATENTS

| | | |
|---|---|---|
| 2,169,714 | Urtel | Aug. 15, 1939 |
| 2,516,587 | Peterson | July 25, 1950 |
| 2,580,421 | Guanella | Jan. 1, 1952 |
| 2,657,253 | Bedford | Oct. 27, 1953 |
| 2,681,384 | Guanella | June 15, 1954 |

OTHER REFERENCES

Theory and Applications of Electron Tubes, Reich, 1944, pages 197–209.